D. GREENBERG, J. MARKEWICH & J. H. BROWN.
APPARATUS FOR ADVERTISING PURPOSES.
APPLICATION FILED APR. 6, 1909.
1,057,726.
Patented Apr. 1, 1913.
2 SHEETS—SHEET 2.
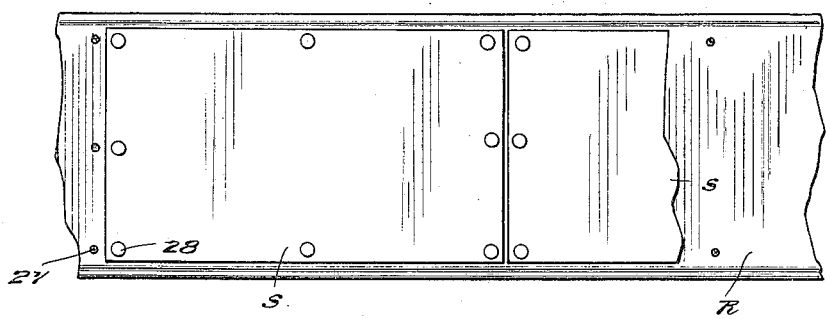
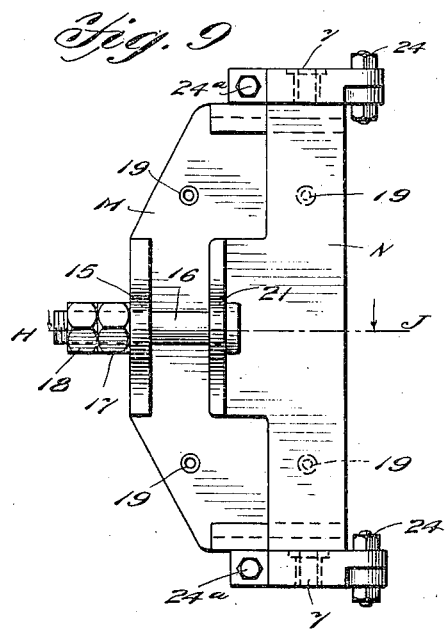
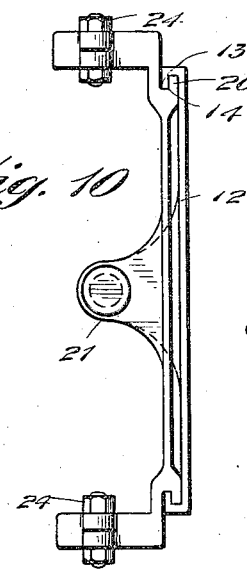
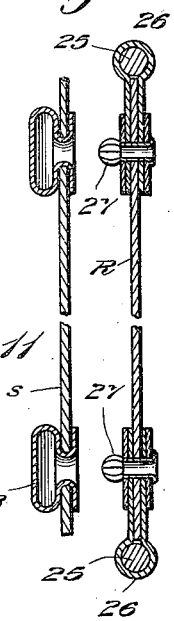
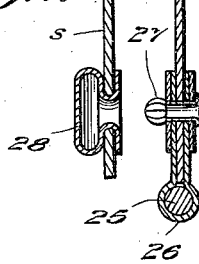
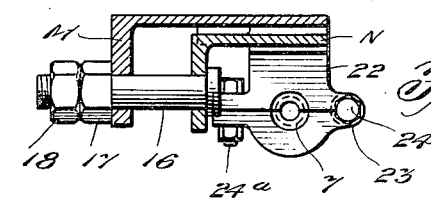

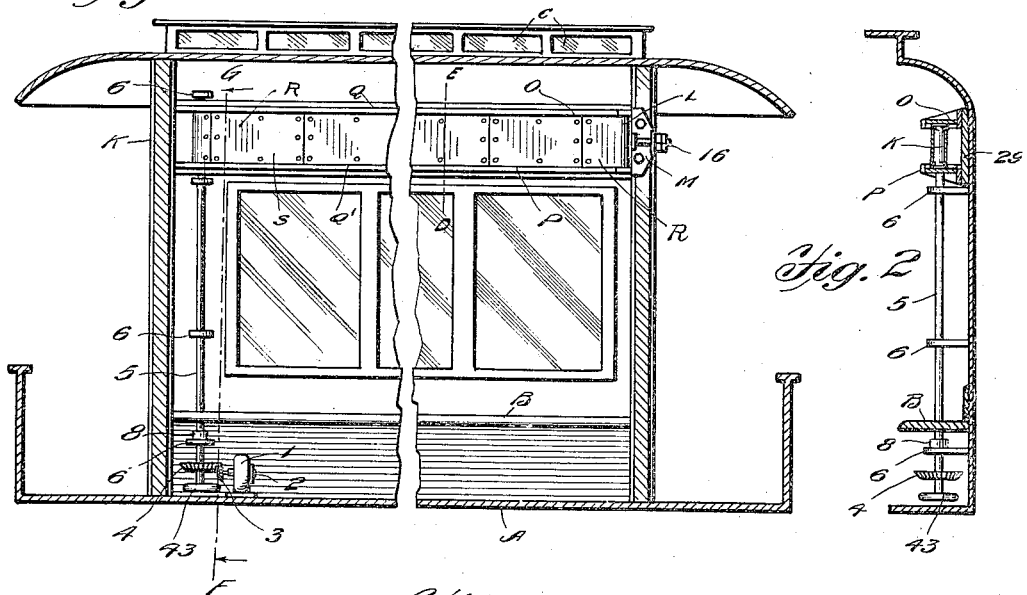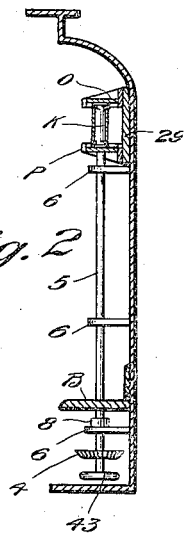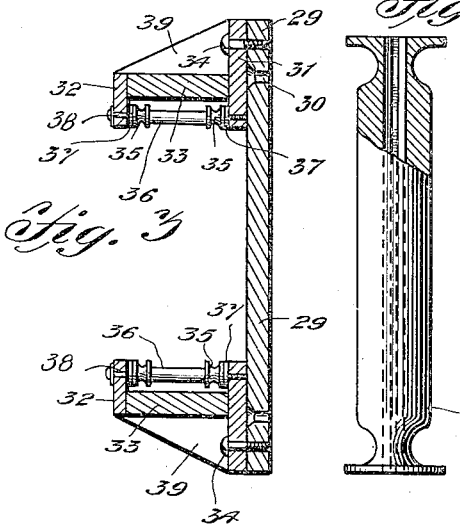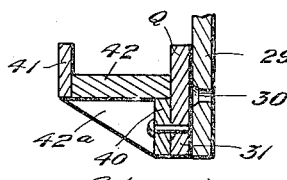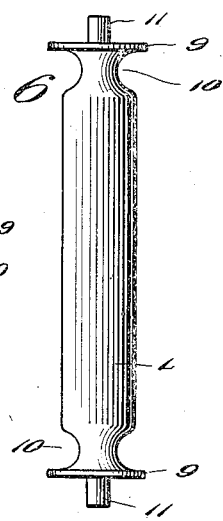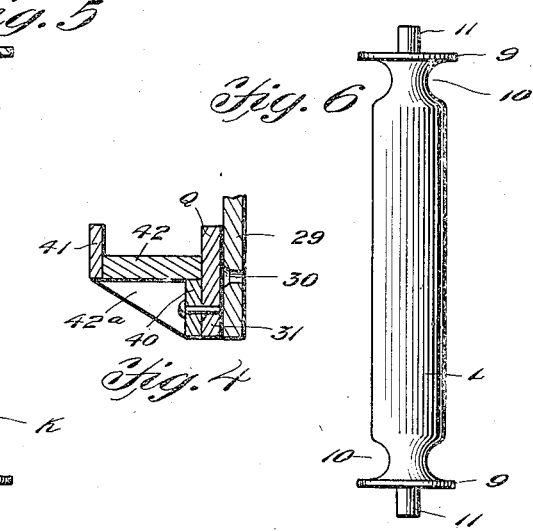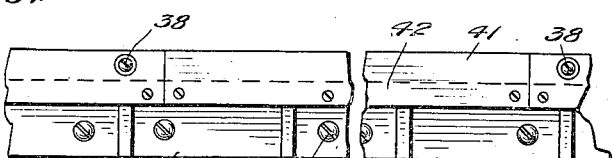

UNITED STATES PATENT OFFICE.

DAVID GREENBERG, OF PASSAIC, NEW JERSEY, AND JACOB MARKEWICH AND JACOB H. BROWN, OF NEW YORK, N. Y.

APPARATUS FOR ADVERTISING PURPOSES.

1,057,726.  Specification of Letters Patent.  Patented Apr. 1, 1913.

Application filed April 6, 1909. Serial No. 488,310.

*To all whom it may concern:*

Be it known that we, DAVID GREENBERG, residing in the city of Passaic, county of Passaic, State of New Jersey, and JACOB MARKEWICH and JACOB H. BROWN, residing in the borough of Manhattan, city of New York, county and State of New York, citizens of the United States, have jointly invented a new and useful Apparatus for Advertising Purposes, of which the following is a specification.

Our invention relates to improvements in the mode of advertising and is applicable to any situation where stationary advertising is used; and the object thereof is to place every advertisement along a line of advertising, before an observer no matter at what point before such line of advertising he or she may be seated or standing, while doubling the available space for display and making of the display a more attractive feature than it now is. To this end we use a continuous belt actuated by a keyed roller on a motor driven geared shaft, the stretch of which belt is taken up by a tightening device at one end of its course; using individual cards fixed to said belt and suitable guides at proper intervals in the belt course. A hand wheel is mounted on the power shaft so the belt can be carefully adjusted and moved whereby cards can be secured to and removed from said belt.

Street car advertising most comprehensively defines the features of the application of our invention, so we preferably illustrate this specific application in the accompanying drawing in which similar letters refer to similar parts throughout the several views.

Figure 1 is a longitudinal vertical sectional view of a car provided with the improved apparatus, Fig. 2 is a detail sectional view thereof, showing the vertical operating shaft, Fig. 3 is a detail sectional view of a belt supporting device, Fig. 4 is a detail sectional view of one end thereof, with the belt roller thereof removed, Fig. 5 is a side elevation, partly in section, of a belt roller, Fig. 6 is a side elevation of another belt roller, Fig. 7 is a fragmental detailed view of the lower belt channel, Fig. 8 is detail side elevation of the belt, Fig. 9 is a side elevation of a belt tightening device, Fig. 10 is an end elevation thereof, Fig. 11 is a transverse sectional view of a card, and Fig. 11ª is a similar view of a belt, and Fig. 12 is a sectional view taken on line H—J of Fig. 9.

Underneath the seat, B, fastened to the floor, A, of the car, we place an electric motor, 1, upon the shaft, 2, of which is keyed a pinion, 3, meshing with a bevel gear, 4, reducing the speed appropriately to the required speed of the vertical shaft, 5, revolving in wall bolted bearings, 6, preferably fitted with commercial type graphite filled slotted bushings similar to 7, to avoid the use of oil; said vertical shaft being held in position by screw fixed collars, 8, preferably of bronze to reduce friction.

On the upper end of the shaft 5 a roller K is mounted, which roller is formed with end flanges 9 and peripheral grooves or recesses 10, to receive the edges of the belt R, which carries the advertisements. A second roller L supports the opposite end of the belt R and is provided with trunnions 11, which are journaled in the split bearings 22, which bearings are provided with graphite filled slotted bushings 7. These bearings are further provided with ears 23, which are connected by a pintle bolt 24, said bearings being held closed by a lock nut 24ª. The bearings 2 are connected to a roll holder N, which is movably mounted on a belt tightener base M, which base is provided with a screw 16, engaging the roll holder N and fastened by lock nuts 17 and 18 to said base M. The belt R is provided with a wearing or guiding edge 25, incased by a leather covering 26, which is secured in place by suitable fasteners.

Under the ventilation devices C of the car, a wall plate 29, running the full length of the display space is secured to the side of the car by screws extended through screw holes 30. Top and bottom belt channel or guide holders O and P respectively, are secured by screws 34, extended through their backs 31, to the plate 29. The channels or holders O and P are provided with horizontal members 33 which are provided with vertical members 32, secured thereon. On the holders O and P two grooved wheels 35 are journaled, being spaced from each other by tubes 36 mounted on shaft bolts 38 and being spaced from the adjacent parts of the holders by washers 37. The horizontal members are supported by brackets 39. The holders O and P are provided with top and bottom members Q and Q' to afford access to the belt R. 40 denotes the back section of said members, 41 the vertically disposed section, 42 the horizontally disposed section and 42ª the supporting bracket. A belt R is movable on the holders O and P, which belt is adapted to carry removably secured cards, S, which cards are provided with female fasteners 28, adapted to engage with male fasteners 27, carried by the belt R.

In order to provide for the stretching of the belt R a member M, having an ear 15, is provided with a member N, slidably located thereon, which is connected to said ear 15 by means of a screw bolt 16, which is extended through an ear 21 of the member N and the ear 15 of the member M. The bolt 16 carries tightening nuts 17 and 18, whereby the belt holder carried by the sliding member N can be moved and held in its moved or adjusted position. It will be noticed that the ears or lugs 15 and 21 formed upon the sliding member N and bracket M are formed at right angles thereupon and that to enable member N to be slidably guided parallel-spaced inwardly-extending flanges 13 are formed upon bracket M and corresponding offsets 14 formed upon member N, at the top and bottom thereof, the offsets 14 being guided between said flanges and the body of bracket M.

We claim—

1. A device of the character described comprising an elongated support, spaced apart rollers mounted vertically thereon, a plurality of pintles disposed at right angles relatively to said support, and arranged in vertical pairs, means carried by said support for holding the ends of said pintles, relatively-small grooved rollers journaled at the ends of each pintle, spacing sleeves on each pintle holding said last-named rollers against displacement, an endless web mounted on said vertically-disposed rollers and having its opposite edges guided in movement by said relatively-small rollers, and means for setting said web in motion over said vertical rollers.

2. In combination a longitudinal support, spaced apart rollers vertically journaled thereupon, each roller having concave grooves at its ends, an endless web mounted on said rollers, a flexible rounded bead formed on each longitudinal edge of said web fitting the oppositely-arranged grooves of said rollers, flanges formed on the ends of each roller for holding said web against displacement, means for setting said web in motion, a plurality of pintles disposed at right angles to said support and arranged in vertical pairs, relatively small grooved rollers mounted at the ends of each pintle, means for supporting said pintles, said beads fitting said last-named grooved rollers, and means for holding said last-named grooved rollers against endwise displacement.

DAVID GREENBERG.
JACOB MARKEWICH.
JACOB H. BROWN.

Witnesses:
SADIE MARKEWICH,
BERTHA L. ALLEN.